US012636883B2

(12) United States Patent
Min et al.

(10) Patent No.: US 12,636,883 B2
(45) Date of Patent: May 26, 2026

(54) INKJET PRINTING APPARATUS AND INKJET PRINTING METHOD USING THE SAME

(71) Applicant: Samsung Display Co., Ltd., Yongin-si (KR)

(72) Inventors: Honggi Min, Yongin-si (KR); Jongsung Kim, Yongin-si (KR); Sangjin Lee, Yongin-si (KR); Hee Jung Lee, Yongin-si (KR); Myungsoo Huh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 141 days.

(21) Appl. No.: 18/509,511

(22) Filed: Nov. 15, 2023

(65) Prior Publication Data

US 2024/0326419 A1 Oct. 3, 2024

(30) Foreign Application Priority Data

Mar. 31, 2023 (KR) ........................ 10-2023-0043077

(51) Int. Cl.
*B41J 2/045* (2006.01)
*B41J 2/145* (2006.01)

(52) U.S. Cl.
CPC ........... *B41J 2/04593* (2013.01); *B41J 2/145* (2013.01)

(58) Field of Classification Search
CPC .............................. B41J 2/04593; B41J 2/145
See application file for complete search history.

(56) References Cited

U.S. PATENT DOCUMENTS 5,997,124 A * 12/1999 Capps .................... B41J 2/0457 347/14
6,846,066 B2 * 1/2005 Teshikawara .......... B41J 2/2125 347/15
8,419,145 B2 4/2013 Xie

FOREIGN PATENT DOCUMENTS

KR 20190123811 A 11/2019

* cited by examiner

*Primary Examiner* — Jason S Uhlenhake
(74) *Attorney, Agent, or Firm* — CANTOR COLBURN LLP

(57) ABSTRACT

An inkjet printing apparatus includes a head pack including a plurality of heads, wherein each of the plurality of heads includes a plurality of nozzles, wherein each of the plurality of heads extends in a first direction and is disposed adjacent to each other in a second direction intersecting the first direction, and a volume of a droplet ejected from each of the plurality of nozzles is alternately set to a first volume larger than a reference volume and a second volume smaller than the reference volume for each of the plurality of heads along the second direction.

19 Claims, 11 Drawing Sheets

INKJET PRINTING APPARATUS AND INKJET PRINTING METHOD USING THE SAME

This application claims priority to Korean Patent Application No. 10-2023-0043077, filed on Mar. 31, 2023, and all the benefits accruing therefrom under 35 U.S.C. § 119, the content of which in its entirety is herein incorporated by reference.

BACKGROUND

1. Field

The invention relates to an inkjet printing apparatus and, more particularly, to an inkjet printing apparatus for manufacturing a display device and an inkjet printing method using the inkjet printing apparatus.

2. Description of the Related Art

A display device is a device that displays an image to provide visual information to a user. Among display devices, an organic light emitting diode display (OLED display) has recently been attracting attention.

SUMMARY

Embodiments provide an inkjet printing apparatus that improves display quality.

Embodiments provide an inkjet printing method using the inkjet printing apparatus.

An inkjet printing apparatus according to an embodiment may include a head pack including a plurality of heads.

In an embodiment, each of the plurality of heads may include a plurality of nozzles, each of the plurality of heads may extend in a first direction and may be disposed adjacent to each other in a second direction intersecting the first direction, and volume of a droplet ejected from each of the plurality of nozzles may be alternately set to a first volume larger than a reference volume and a second volume smaller than the reference volume for each of the plurality of heads disposed along the second direction.

In an embodiment, the plurality of nozzles included in each of the plurality of heads may not overlap each other in the second direction.

In an embodiment, an absolute value of an excess ratio of the first volume to the reference volume and an absolute value of a deficiency ratio of the second volume to the reference volume may be equal to each other.

In an embodiment, the excess ratio of the first volume to the reference volume may be about +1.5%, and the deficiency ratio of the second volume to the reference volume may be about −1.5%.

In an embodiment, each of an absolute value of the excess ratio of the first volume to the reference volume and an absolute value of the ratio of the deficiency ratio of the second volume to the reference volume may be about 50% of a volume resolution of the droplet ejected from each of the plurality of nozzles.

In an embodiment, the volume resolution of the droplet ejected from each of the plurality of nozzles may be about 3%.

In an embodiment, the plurality of heads may include first to fifth heads sequentially aligned in the second direction.

In an embodiment, heads disposed adjacent to each other in the second direction among the first to fifth heads may have different volumes of droplet.

In an embodiment, each of the nozzles of the first head may eject a droplet having a first volume, each of nozzles of the second head may eject a droplet having a second volume, each of nozzles of the third head may eject a droplet having the first volume, each of nozzles of the fourth head may eject a droplet having the second volume, and each of nozzles of the fifth head may eject a droplet having the first volume.

In an embodiment, volume of the droplet ejected from each of the nozzles of the first head may be about +1.5% of the reference volume, volume of the droplet ejected from each of the nozzles of the second head may be about −1.5% of the reference volume, volume of the droplet ejected from each of the nozzles of the third head may be about +1.5% of the reference volume, volume of the droplet ejected from each of the nozzles of the fourth head may be about −1.5% of the reference volume, and volume of the droplet ejected from each of the nozzles of the fifth head may be about +1.5% of the reference volume.

In an embodiment, volume of a droplet ejected from each of the nozzles may be adjusted by adjusting a voltage for each of the plurality of heads.

In an embodiment, the head pack may move in the second direction.

In an embodiment, each of the plurality of heads may include nozzle columns including a plurality of nozzles overlapping each other in the first direction, and a volume of a droplet ejected by each of the plurality of nozzles may be different for each of the plurality of nozzle columns.

An inkjet printing method according to an embodiment may include ejecting a plurality of droplets having a first volume on a substrate by moving a plurality of nozzles included in a first head extending in a first direction, in a second direction intersecting the first direction, ejecting a plurality of droplets having a second volume different from the first volume on the substrate by moving a plurality of nozzles included in a second head in the second direction, and the second head may be located adjacent to the first head in the second direction, and ejecting a plurality of droplets having the first volume by moving a plurality of nozzles included in a third head in the second direction, and the third head may be located adjacent to the second head in the second direction.

In an embodiment, the first volume may be larger than a reference volume, and the second volume may be smaller than the reference volume.

In an embodiment, an absolute value of an excess ratio of the first volume to the reference volume and an absolute value of a deficiency ratio of the second volume to the reference volume may be equal to each other.

In an embodiment, the excess ratio of the first volume to the reference volume may be about +1.5%, and the deficiency ratio of the second volume to the reference volume may be about −1.5%.

In an embodiment, the plurality of nozzles included in each of the plurality of heads may not overlap each other in the second direction.

In an embodiment, a volume of a droplet ejected from each of the nozzles may be adjusted by adjusting a voltage for each of the plurality of heads.

In the inkjet printing apparatus according to embodiments, when the inkjet printing apparatus includes the plurality of nozzles that eject droplets having different volume alternately in a direction in which the plurality of nozzles eject droplets, reliability of the inkjet printing apparatus may be improved. Specifically, since volume of a droplet ejected from each of the nozzles are different from each other, line stains on the display device due to periodic repeatability of volume of the droplet may be reduced or prevented. Also, distribution of volume of the droplet may be reduced or prevented. Accordingly, display quality of the display device may be improved.

It is to be understood that both the foregoing general description and the following detailed description are exemplary and explanatory and are intended to provide further explanation of the invention.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
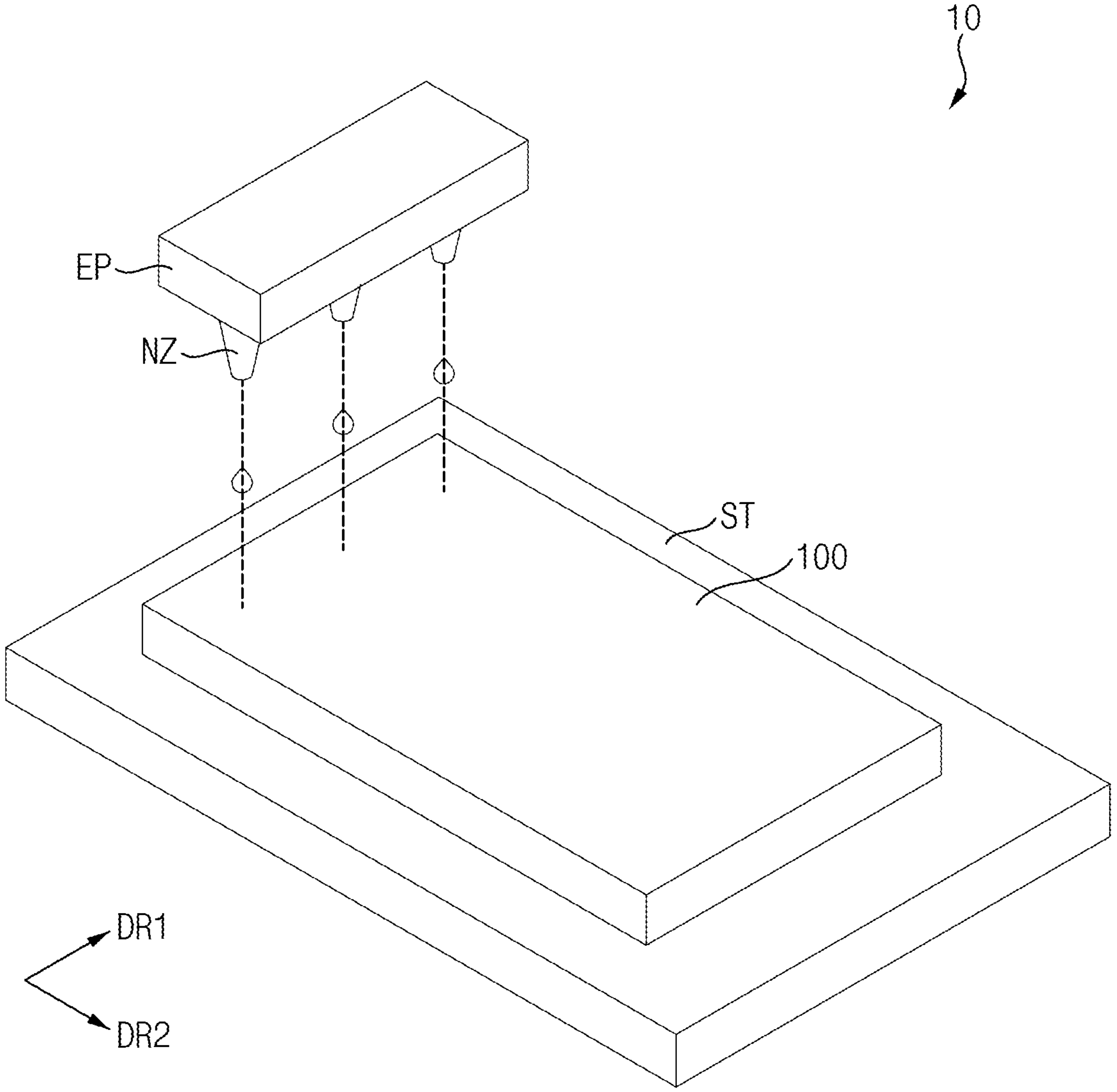
FIG. 1 is a perspective view illustrating an inkjet printing apparatus, according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 is a view illustrating an inkjet printing apparatus, according to an embodiment.

In an embodiment and referring to FIG. 1, the inkjet printing apparatus 10 may include an ejection part EP and a stage ST. The ejection part EP included in the inkjet printing apparatus 10 may eject a droplet onto a target substrate 100 to be printed. The target substrate 100 may be disposed on the stage ST included in the inkjet printing apparatus 10. Accordingly, a display device may be formed by applying the droplet on the target substrate 100.

For example, in an embodiment, a plurality of pixel areas (e.g., pixel areas PXA of FIG. 5) may be aligned on the target substrate 100. A plurality of pixels (e.g., the pixels PX of FIGS. 5 and 8) may be disposed in each of the plurality of pixel areas. The inkjet printing apparatus may be used to form the plurality of pixels by filling the plurality of pixel areas with the droplet.

Figure 2:
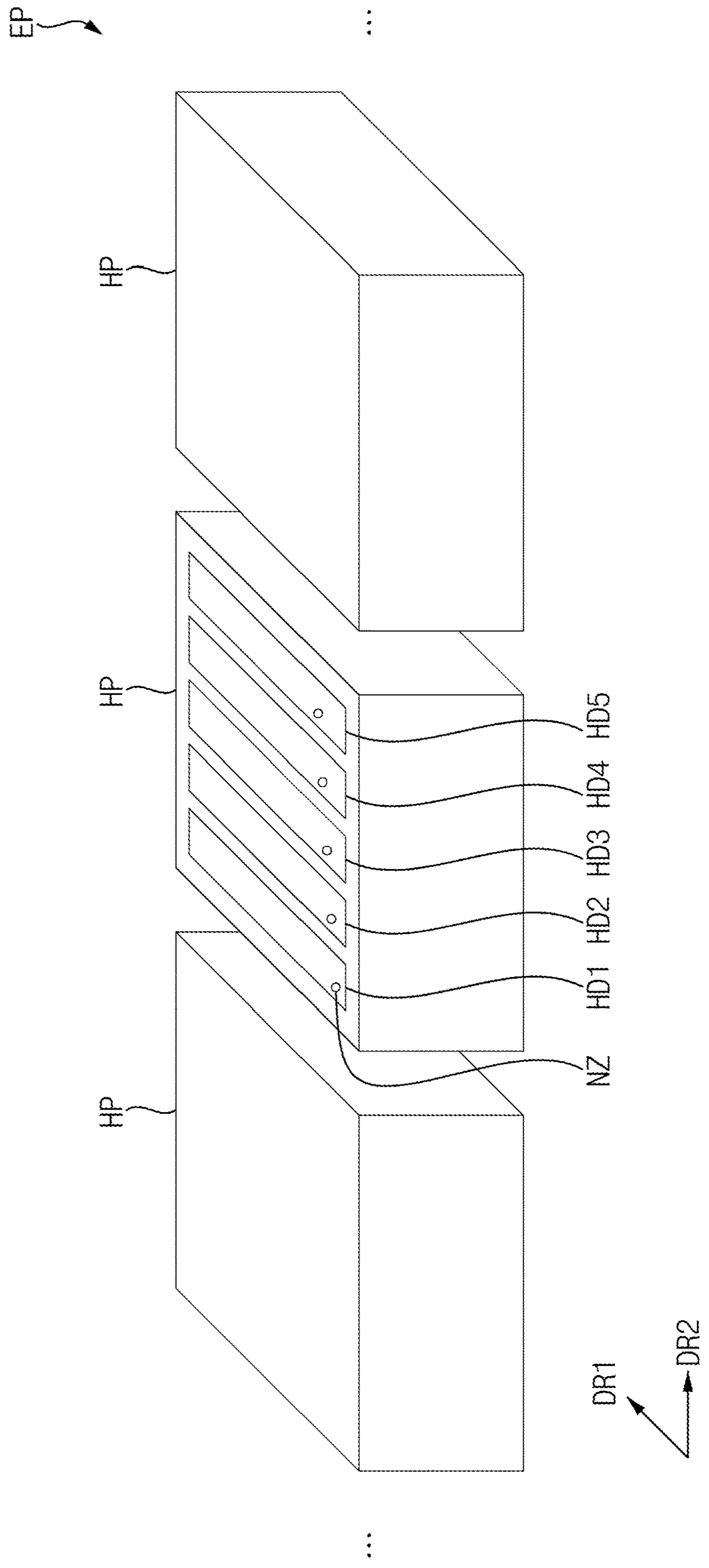
FIG. 2 is a perspective view illustrating an inkjet printing apparatus, according to an embodiment.
Figure 3:
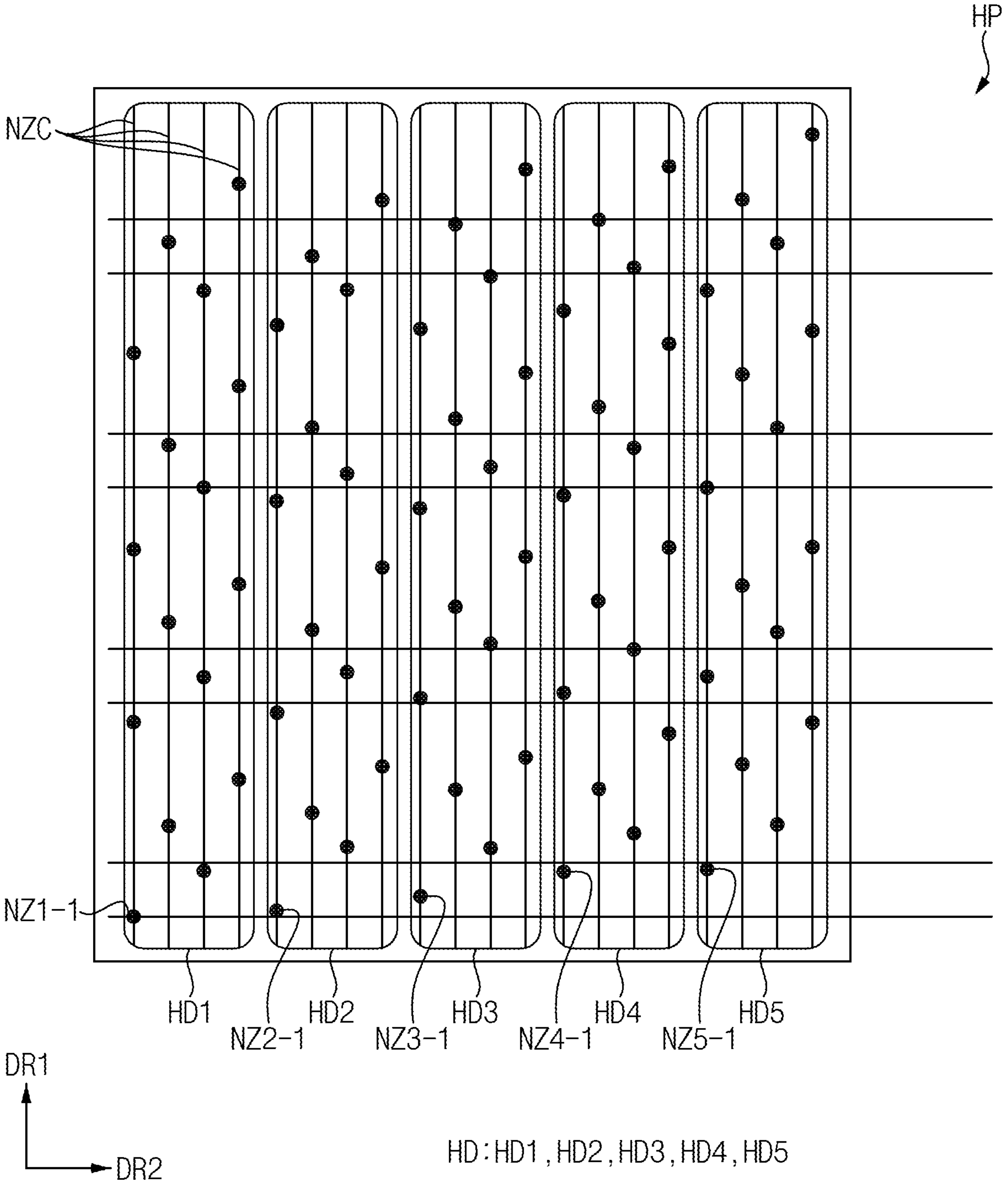
FIG. 3 is a plan view illustrating an inkjet printing apparatus, according to an embodiment.

FIG. 2 is a perspective view illustrating an inkjet printing apparatus, according to an embodiment. FIG. 3 is a plan view illustrating an inkjet printing apparatus, according to an embodiment.

For example, FIG. 2 may illustrate an embodiment of head packs HP included in the inkjet printing apparatus, and FIG. 3 may be a plan view illustrating one of the head packs HP of FIG. 2.

In an embodiment and referring to FIGS. 1 to 3, the inkjet printing apparatus 10 may include the ejection part EP and the stage ST. The ejection part EP may include the plurality of head packs HP. The plurality of head packs HP may be arranged along first and second directions DR1 and DR2. The second direction DR2 may intersect the first direction DR1. However, the present invention is not limited thereto.

In an embodiment, all of the plurality of head packs HP may move in the second direction DR2. However, the present invention is not limited thereto, and the plurality of head packs HP may move in directions different from the first direction DR1, and the stage ST may move instead of the plurality of head packs HP.

In an embodiment, each of the plurality of head packs HP may include a plurality of heads HD. Each of the plurality of heads HD may extend in the first direction DR1. Also, the plurality of heads HD may be disposed adjacent to each other in the second direction DR2.

In an embodiment, each of the plurality of heads HD may include a plurality of nozzles NZ. For example, each of the plurality of heads HD may include a plurality of nozzle columns NZC. The plurality of nozzle columns NZC may extend in the first direction DR1 within the plurality of heads HD.

Also, in an embodiment, each of the plurality of nozzle columns NZC may include a plurality of nozzles NZ overlapping each other in the first direction DR1. Each of the plurality of nozzles NZ may eject a droplet. The droplet which is ejected may be applied to the target substrate 100.

In an embodiment, the plurality of nozzles NZ may not overlap each other in the second direction DR2. Therefore, since the inkjet printing apparatus 10 includes the nozzles NZ that do not overlap each other in the second direction DR2, the plurality of nozzles NZ may correspond to one of the pixels PX. Accordingly, the number of printing operations may be reduced, and manufacturing efficiency of the display device may be improved.

Figure 4:
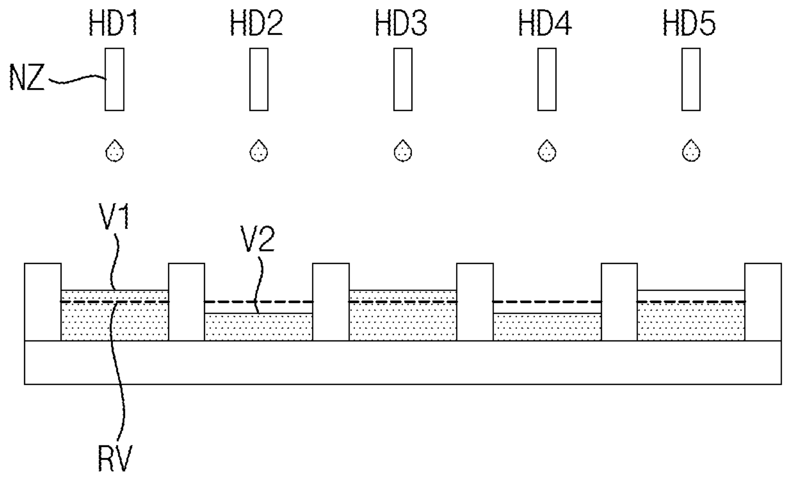
FIG. 4 is a block diagram illustrating the inkjet printing apparatus, according to an embodiment.
Figure 5:
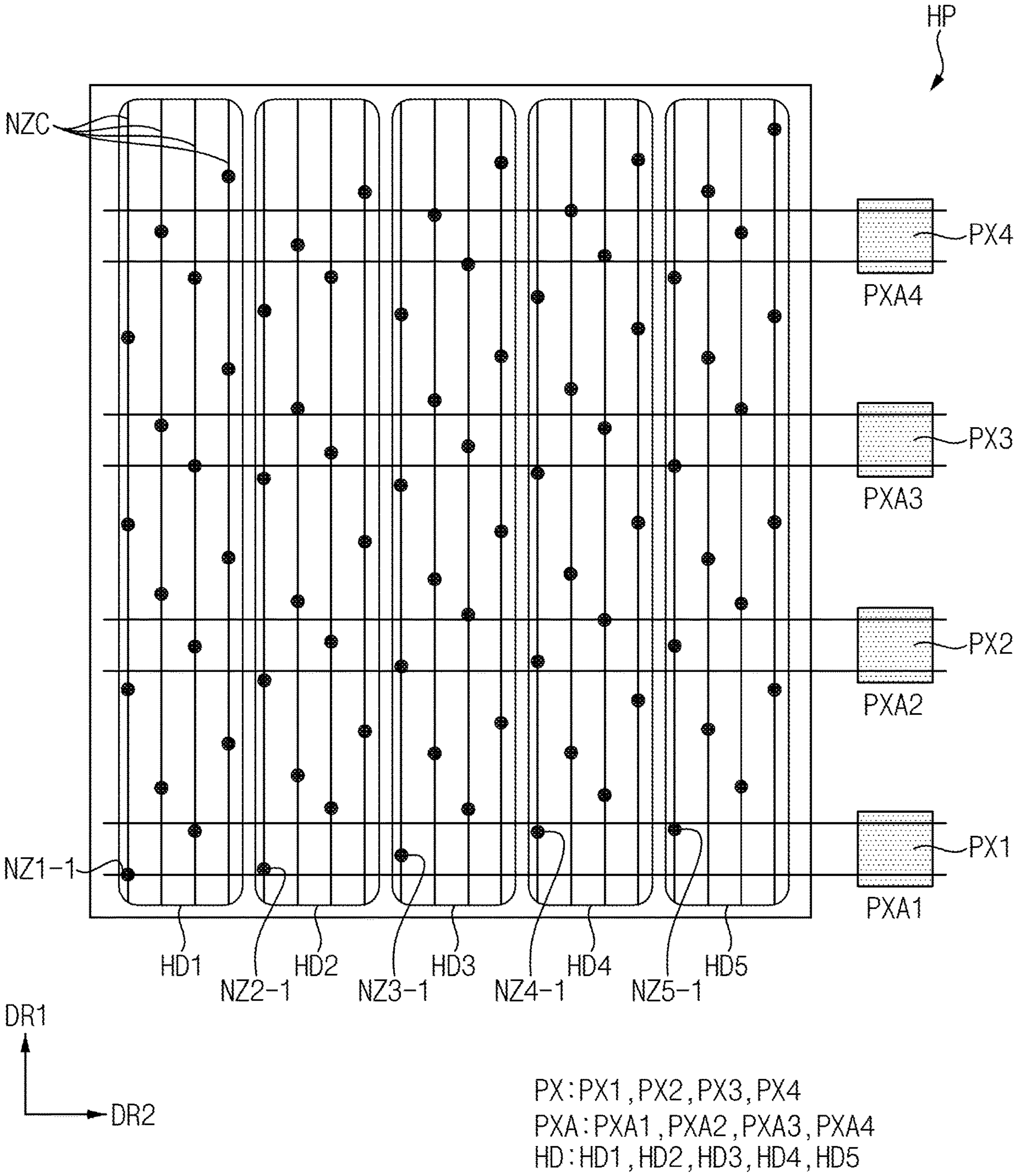
FIG. 5 is a plan view illustrating an inkjet printing apparatus, according to an embodiment.

FIGS. 4 and 5 are views illustrating the inkjet printing apparatus, according to an embodiment.

Referring further to FIG. 4, in an embodiment, a volume of a droplet ejected from each of the plurality of nozzles NZ may be different from each other. For example, a volume of a droplet ejected from each of the plurality of nozzles NZ may be different for each of the plurality of heads HD.

Specifically, in an embodiment, a volume of the droplet ejected from each of the plurality of nozzles NZ may be alternately set to a first volume V1 which is larger than a reference volume RV and a second volume V2 which is smaller than the reference volume RV for each of the plurality of heads HD along the second direction DR2. The reference volume RV may be a volume at which the droplet is ejected most quickly when the droplet is ejected from each of the nozzles NZ under conditions considering a type of the droplet and a type of the inkjet printing apparatus. The reference volume RV of each of the plurality of nozzles NZ may be the same. However, the present invention is not limited thereto.

In an embodiment, an absolute value of an excess ratio of the first volume V1 to the reference volume RV and an absolute value of a deficiency ratio of the second volume V2 to the reference volume RV may be equal to each other. For example, the excess ratio of the first volume V1 to the reference volume RV may be about +1.5%, and the deficiency ratio of the second volume V2 to the reference volume RV may be about −1.5%. In this case, a volume resolution of the droplet ejected from each of the plurality of nozzles NZ may be about 3%. The volume resolution of the droplet may be an excess ratio of a maximum value of volume of the droplet that can be ejected from each of the plurality of nozzles NZ relative to the reference volume RV or may be a deficiency ratio of a minimum value of volume of the droplet that can be ejected from each of the plurality of nozzles NZ relative to the reference volume RV. However, the volume resolution of the droplet according to the present invention is not limited thereto.

In an embodiment, therefore, each of the absolute value of the excess ratio of the first volume V1 to the reference volume RV and the absolute value of the deficiency ratio of the second volume V2 to the reference volume RV may be about 50% of the volume resolution of the droplet ejected from each of the plurality of nozzles NZ.

In an embodiment and referring to FIGS. 1, 4, and 5, for example, the plurality of heads HD may include first to fifth heads HD. The first to fifth heads HD may extend in the first direction DR1 and may be sequentially aligned in the second direction DR2.

In an embodiment, a plurality of pixel areas PXA may be arranged on the target substrate 100. The plurality of nozzles NZ included in the first to fifth heads HD may eject a plurality of droplets onto the plurality of pixel areas PXA. That is, a plurality of pixels PX may be formed in each of the plurality of pixel areas PXA by an inkjet printing method.

In an embodiment, heads HD disposed adjacent to each other in the second direction DR2 among the first to fifth heads HD may have different volumes of the droplet. For example, volume of the droplet of the first head HD1 may be different from volume of the droplet of the second head HD2, the volume of the droplet of the second head HD2 may be different from the volume of the droplet of the first head HD1 and the volume of the droplet of the third head HD3, and the volume of the droplet of the third head HD3 may be different from the volume of the droplet of the second head HD2 and the volume of the droplet of the fourth head HD4. The volume of the droplet of the fourth head HD4 may be different from the volume of the droplet of the third head HD3 and the volume of the droplet of the fifth head HD5, and the volume of the droplet of the fifth head HD5 may be different from the volume of the droplet of the fourth head HD4.

In an embodiment, each of the nozzles NZ of the first head HD1 may eject a droplet having the first volume V1. Each of the nozzles NZ of the second head HD2 may eject a droplet having the second volume V2. Each of the nozzles NZ of the third head HD3 may eject a droplet having the first volume V1. Each of the nozzles NZ of the fourth head HD4 may eject a droplet having the second volume V2. Each of the nozzles NZ of the fifth head HD5 may eject a droplet having the first volume V1. The first volume V1 may be different from the second volume V2 and the first volume V1 may be larger than the reference volume RV, and the second volume V2 may be smaller than the reference volume RV. That is, the first to fifth heads HD may eject droplets having different volumes alternately in the second direction DR2.

That is, in an embodiment, the plurality of nozzles NZ included in the first head HD1 may move in the second direction DR2 and discharge a plurality of droplets having the first volume V1 onto the first to fourth pixels PX1, PX2, PX3, and PX4, respectively. The plurality of nozzles NZ included in the second head HD2 may move in the second direction DR2 and discharge a plurality of droplets having the second volume V2 onto the first to fourth pixel areas PXA1, PXA2, PXA3, and PXA4, respectively. The plurality of nozzles NZ included in the third head HD3 may move in the second direction DR2 and eject a plurality of droplets having the first volume V1 onto the first to fourth pixel areas PXA1, PXA2, PXA3, and PXA4, respectively. The plurality of nozzles NZ included in the fourth head HD4 may move in the second direction DR2 and eject a plurality of droplets having the second volume V2 onto the first to fourth pixel areas PXA1, PXA2, PXA3, and PXA4, respectively. The plurality of nozzles NZ included in the fifth head HD5 may move in the second direction DR2 and eject a plurality of droplets having the first volume V1 onto the first to fourth pixel areas PXA1, PXA2, PXA3, and PXA4, respectively.

Accordingly, in an embodiment, the volume of the droplet ejected from each of the nozzles NZ of the first head HD1 may be about +1.5% of the reference volume RV. The volume of the droplet ejected from each of the nozzles NZ of the second head HD2 may be about −1.5% of the reference volume RV. The volume of the droplet ejected from each of the nozzles NZ of the third head HD3 may be about +1.5% of the reference volume RV. The volume of the droplet ejected from each of the nozzles NZ of the fourth head HD4 may be about −1.5% of the reference volume RV. The volume of the droplet ejected from each of the nozzles NZ of the fifth head HD5 may be about +1.5% of the reference volume RV.

In an embodiment, when the volume of the droplet ejected from each of the plurality of nozzles NZ is different for each of the plurality of heads HD, the volume of the droplet ejected from each of the plurality of nozzles NZ may be adjusted by adjusting the voltage for each of the plurality of heads HD. For example, when the voltage is increased, volume of the droplet ejected from each of the plurality of nozzles NZ may increase. On the other hand, when the voltage is decreased, the volume of the droplet ejected from each of the plurality of nozzles NZ may be reduced. However, the present invention is not limited thereto, and in another embodiment, the volume of the droplet ejected from each of the plurality of nozzles NZ may be different for each of the plurality of nozzle columns NZC included in the plurality of heads HD. In this case, volume of the droplet ejected from each of the plurality of nozzles NZ may be adjusted by adjusting voltage for each of the plurality of nozzle columns NZC.

In an embodiment, when the inkjet printing apparatus 10 includes the plurality of nozzles NZ that eject droplets having different volume alternately in a direction in which the plurality of nozzles NZ eject droplets, reliability of the inkjet printing apparatus 10 may be improved. Specifically, since the volume of a droplet ejected from each of the nozzles NZ are different from each other, line stains on the display device due to periodic repeatability of volume of the droplet may be reduced or prevented. Also, distribution of the volume of the droplet may be reduced or prevented. Accordingly, display quality of the display device may be improved.

Figure 6:
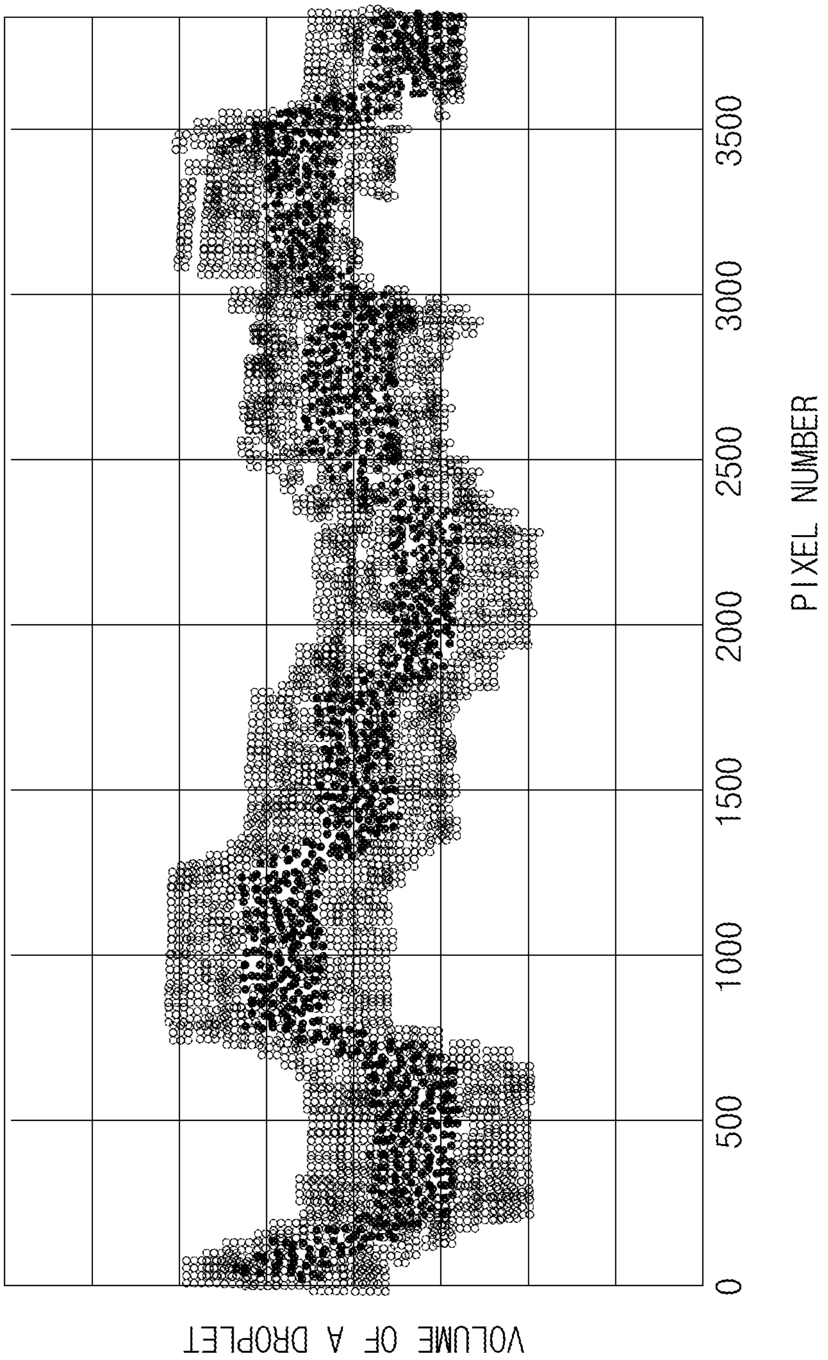
FIG. 6 is a graph illustrating volume of a droplet for each of the pixels of the display device manufactured using an inkjet printing apparatus in a Comparative Example 1, according to an embodiment.
Figure 7:
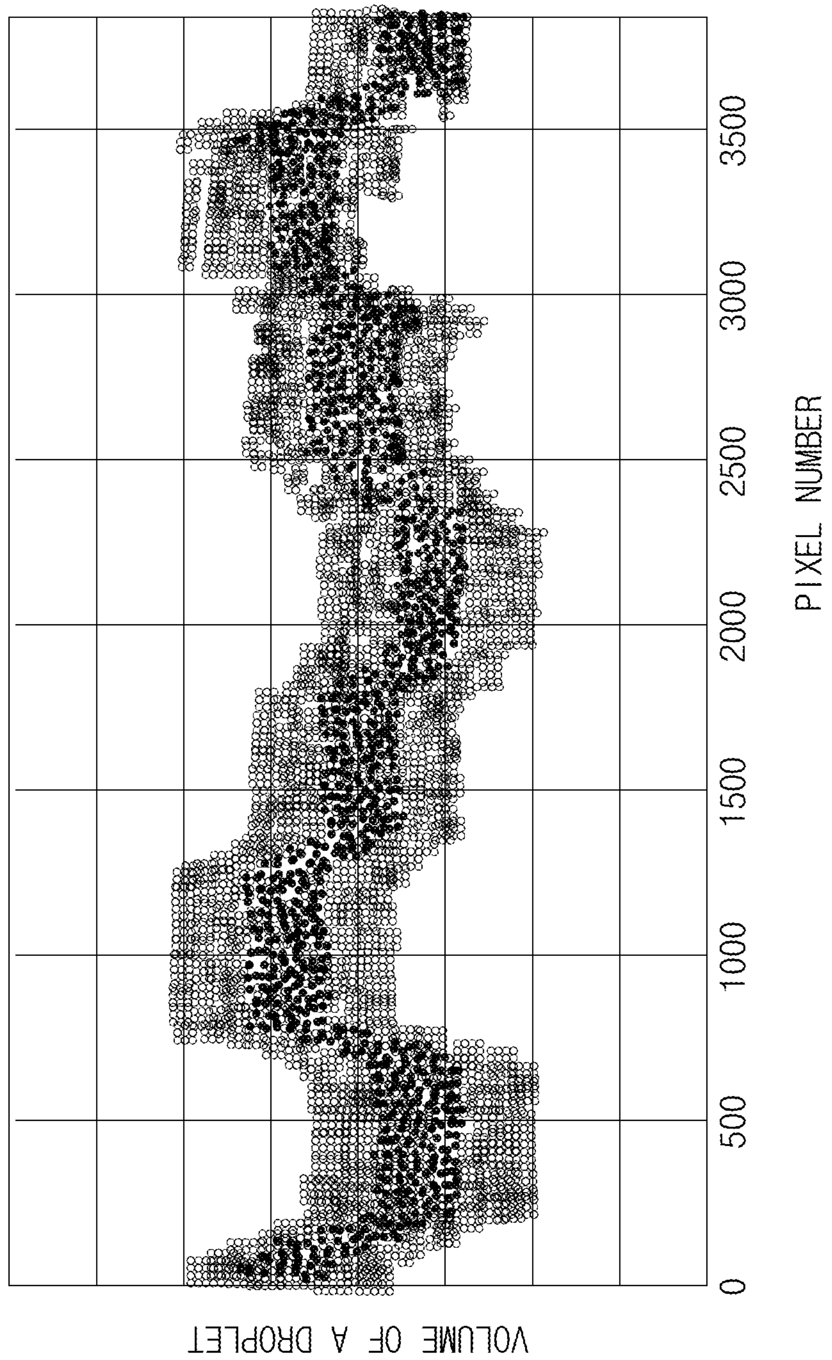
FIG. 7 is a graph illustrating volume of a droplet for each of the pixels of the display device manufactured by an inkjet printing apparatus in a Comparative Example 2, according to an embodiment.
Figure 8:
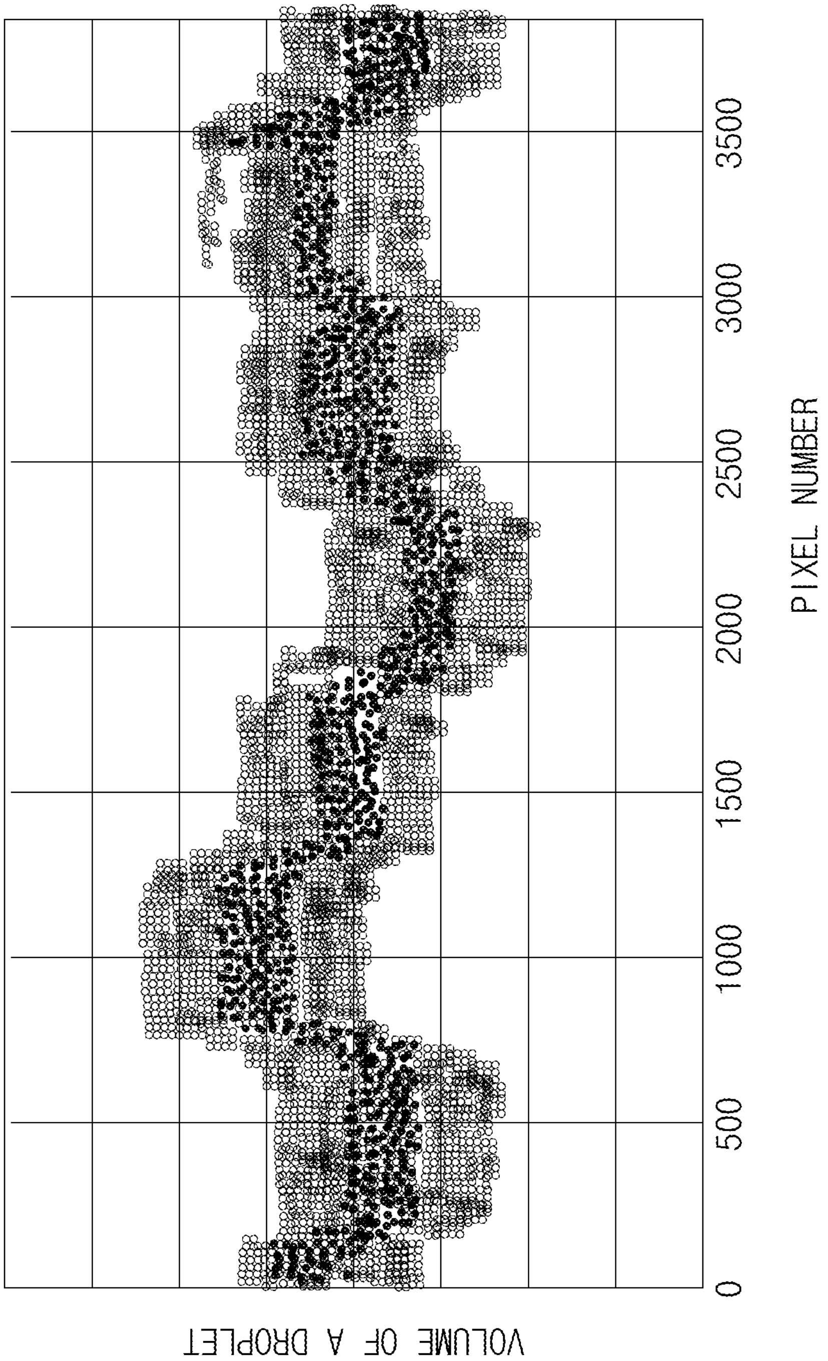
FIG. 8 is a graph illustrating volume of a droplet for each of the pixels of the display device manufactured by an inkjet printing apparatus in an Experimental Example, according to an embodiment.

FIG. 6 is a graph illustrating the volume of a droplet for each of the pixels of the display device manufactured by an inkjet printing apparatus according to Comparative Example 1. FIG. 7 is a graph illustrating the volume of a droplet for each of the pixels of the display device manufactured by an inkjet printing apparatus according to Comparative Example 2. FIG. 8 is a graph illustrating the volume of a droplet for each of the pixels of the display device manufactured by an inkjet printing apparatus according to Experimental Example.

In an embodiment and referring to FIGS. 6 to 8, inkjet printing apparatus according to Comparative Example 1, Comparative Example 2, and Experimental Example applied droplets to more than 3500 pixels. In the inkjet printing apparatus according to Comparative Example 1, the volume of droplets ejected from each of the plurality of nozzles was set to be substantially the same. In the inkjet printing apparatus according to Comparative Example 2, the volume of droplets ejected from each of the plurality of nozzles for each of the plurality of heads was alternately set to +1% or −1% of the reference volume. In the inkjet printing apparatus according to Experimental Example, the volume of droplets ejected from each of the plurality of nozzles for each of the plurality of heads was alternately set to +1.5% or −1.5% of the reference volume.

In an embodiment, in the inkjet printing apparatuses according to Comparative Example 1, Comparative Example 2, and Experimental Example, other conditions were set as the same except for the volume of the droplet ejected. For example, the volume resolution of the droplet according to each of Comparative Example 1, Comparative Example 2, and Experimental Example was set to about 3%. In addition, a moving average line was illustrated as a black point in each of the graphs according to Comparative Example 1, Comparative Example 2, and Experimental Example.

In an embodiment and referring to the graph according to Comparative Example 1, it can be seen that distribution of the volume of the droplet for each of the pixels is large. Similarly, referring to the graph according to Comparative Example 2, it can be seen that the distribution of the volume of the droplet for each of the pixels is large even though smaller than the distribution of Comparative Example 1.

On the other hand, in an embodiment and referring to the graph according to Experimental Example, it can be seen that the distribution of the volume of the droplet for each of the pixels is small. Therefore, in the display device manufactured by the inkjet printing apparatus according to an embodiment, line stains on the display device due to periodic repeatability of the volume of the droplet may be reduced or prevented. Accordingly, display quality of the display device may be improved.

In addition, in an embodiment, frequency analysis was performed through the graphs according to Comparative Example 1, Comparative Example 2, and Experimental Example to see intensity of periodic stains. Intensity of periodic stains according to Comparative Example 1 is about 0.21. Intensity of periodic stains according to Comparative Example 2 is about 0.188. In addition, Intensity of periodic stains according to Experimental Example is about 0.161. Therefore, since intensity of periodic stains according to an embodiment is the smallest, the display device manufactured by the inkjet printing apparatus according to the embodiment may reduce or prevent line stains due to the periodic repeatability of the volume of the droplet. Accordingly, display quality of the display device may be improved.

Figure 9:
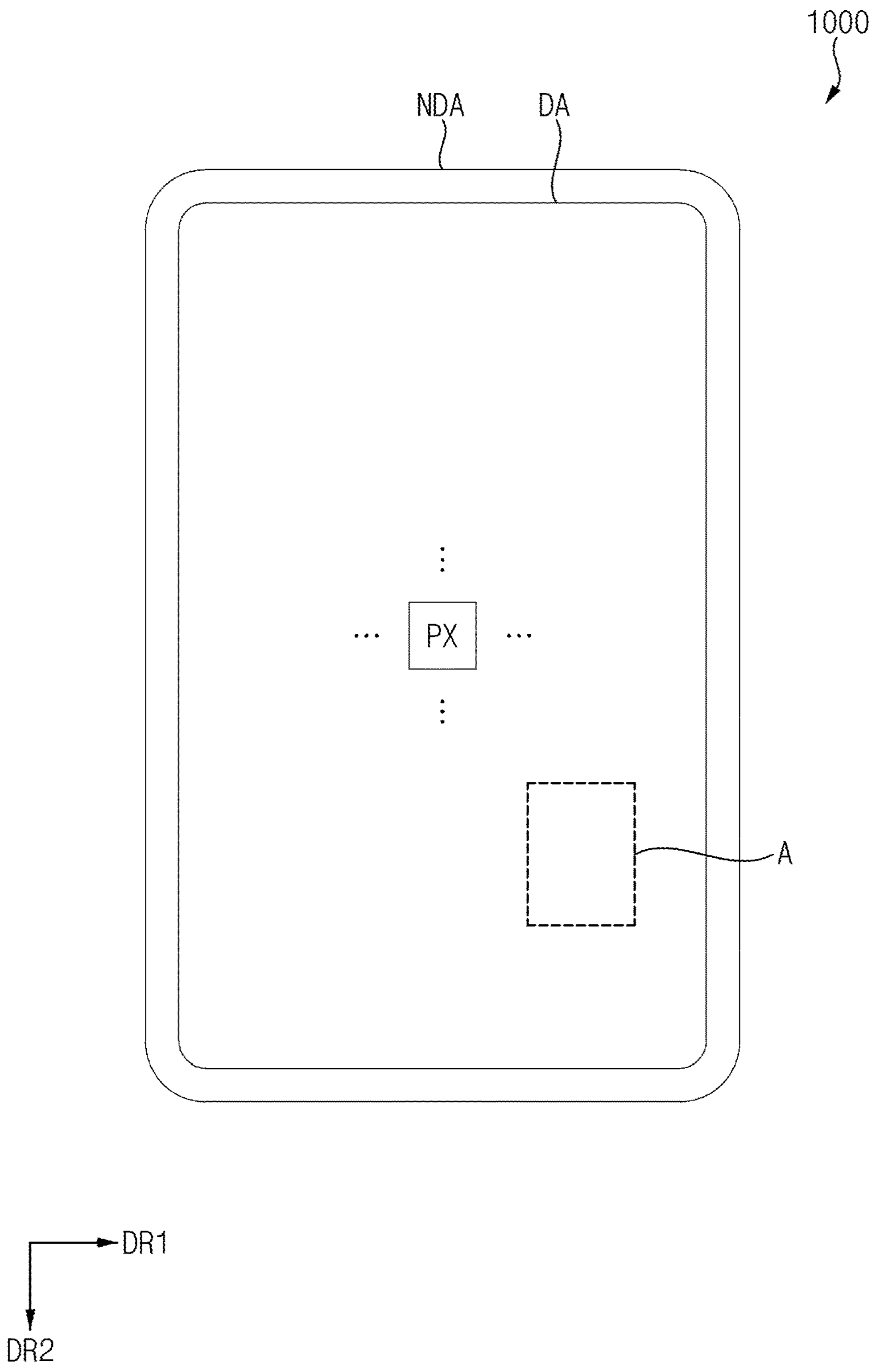
FIG. 9 is a plan view illustrating a display device manufactured by an inkjet printing apparatus, according to an embodiment.
Figure 10:
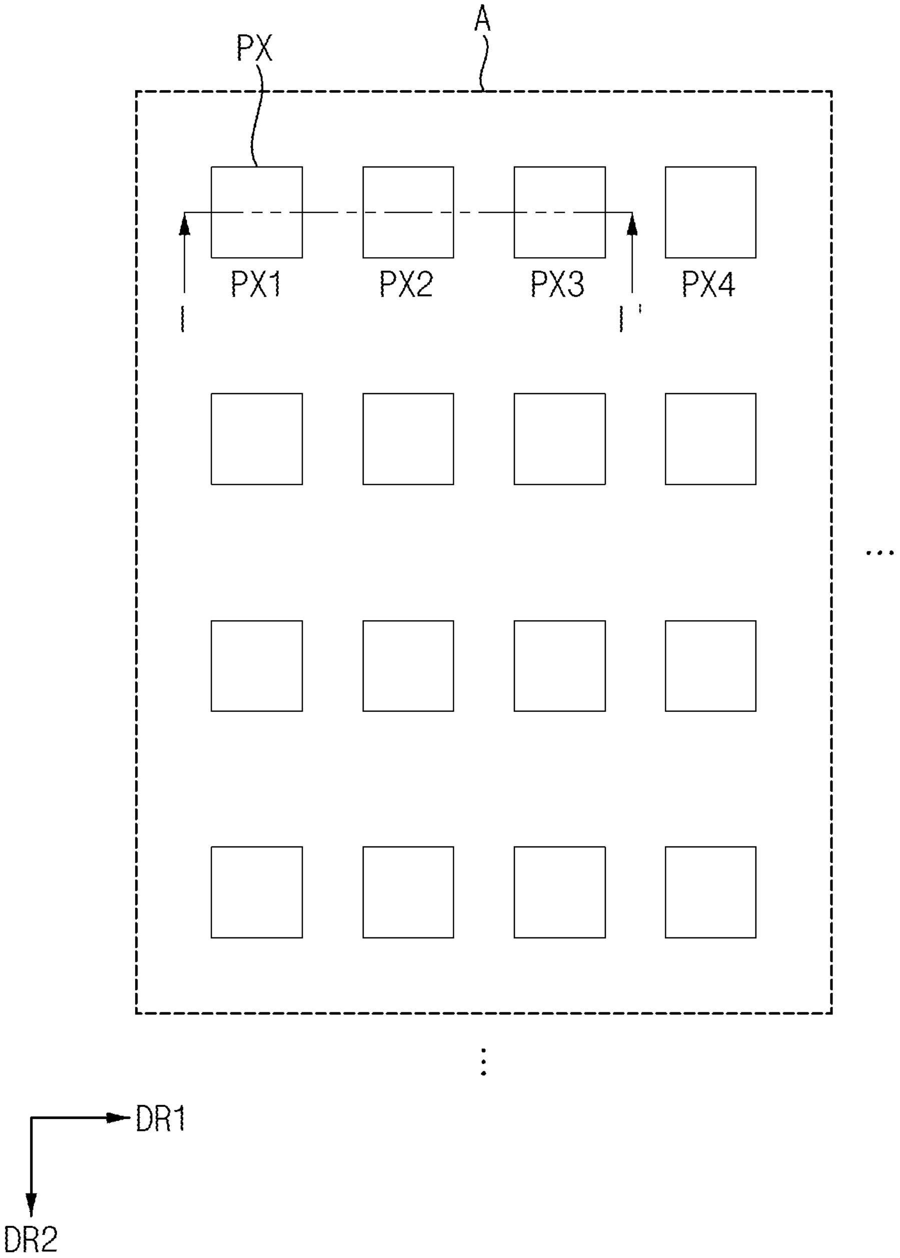
FIG. 10 is an enlarged plan view of area A of FIG. 9, according to an embodiment.
Figure 11:
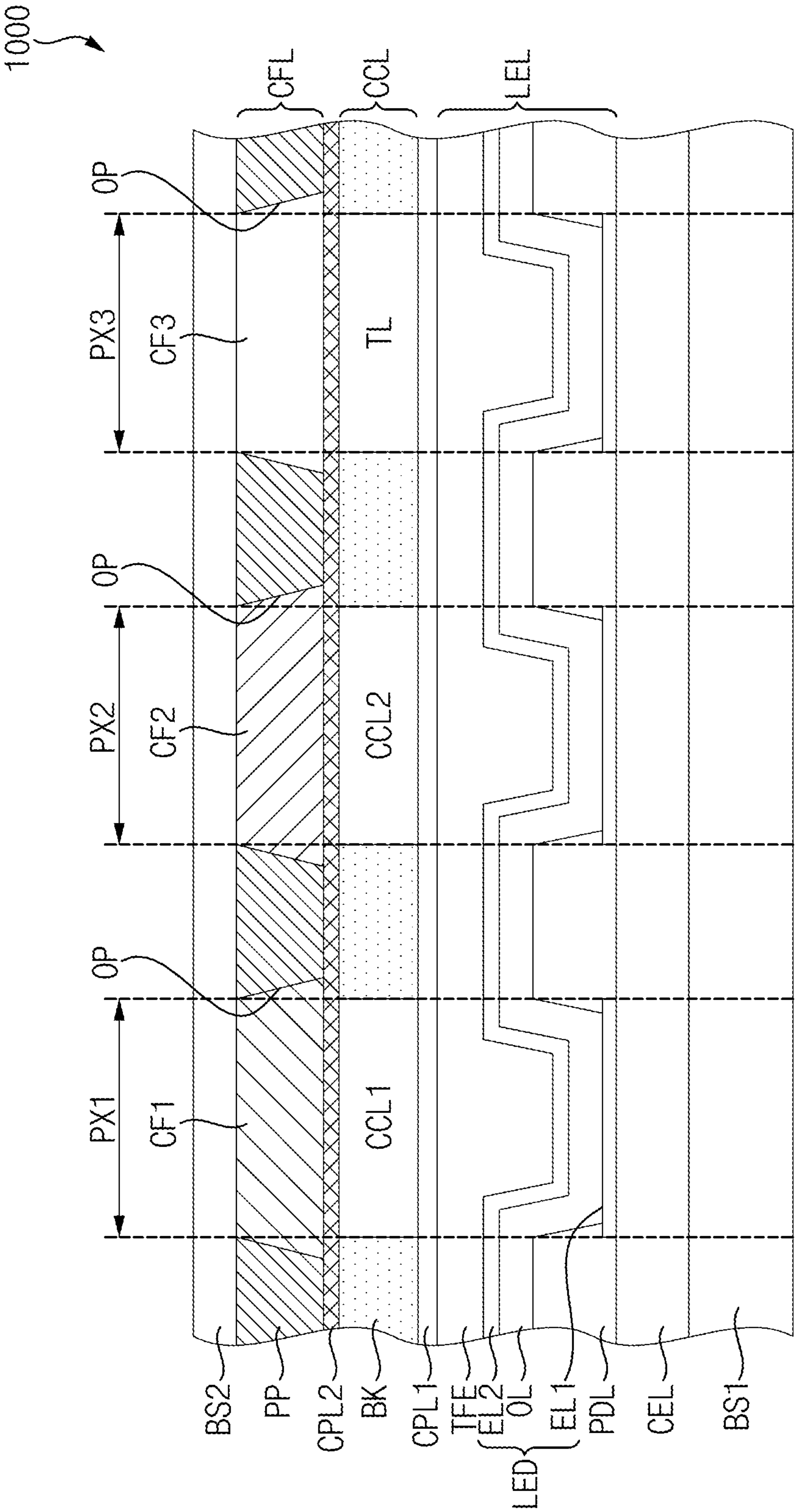
FIG. 11 is a cross-sectional view taken along line I-I' of FIG. 10, according to an embodiment.

FIG. 9 is a plan view illustrating a display device manufactured by an inkjet printing apparatus, according to an embodiment. FIG. 10 is an enlarged plan view of area A of FIG. 9, according to an embodiment. FIG. 11 is a cross-sectional view taken along line I-I' of FIG. 10, according to an embodiment.

In an embodiment and referring further to FIG. 9, the display device 1000 manufactured by the inkjet printing apparatus 10 may include a display area DA and a non-display area NDA. The display area DA may be an area displaying an image. A planar shape of the display area DA may be a rectangular shape or, as shown in FIG. 9, a rectangular shape with rounded corners. However, the planar shape of the display area DA is not limited thereto, and the display area DA may have various planar shapes such as a circular shape, an elliptical shape, and a polygonal shape other than a rectangular shape.

In an embodiment, the non-display area NDA may be disposed around the display area DA. The non-display area NDA may surround the display area DA. The non-display area NDA may be an area not displaying an image. In an embodiment, drivers for displaying an image of the display area DA may be disposed in the non-display area NDA.

In an embodiment, in the display area DA, the pixels PX may be arranged in a matrix along the first and second directions DR1 and DR2, respectively. Signal lines such as a gate line and a data line may be disposed in the display area DA. The signal lines such as the gate line and the data line may be connected to each of the pixels PX. Each of the pixels PX may receive a gate signal, a data signal, and the like from the signal line.

Further, in an embodiment and referring to FIG. 10, the pixels PX may be disposed in the display area DA. The pixels PX may be arranged in a regular arrangement in the display area DA. For example, the pixels PX may include a first pixel PX1, a second pixel PX2, a third pixel PX3, and a fourth pixel PX4. The first pixel PX1, the second pixel PX2, and the third pixel PX3 may be disposed adjacent to each other in the second direction DR2.

For example, each of the first to fourth pixels PX1, PX2, PX3, and PX4, respectively, may display a different basic color. However, the present invention is not limited thereto, and in another embodiment, at least some of the first to fourth pixels PX1, PX2, PX3, and PX4, respectively, may display the same color as each other.

In an embodiment and referring to FIG. 11, the display device 1000 may include a first base substrate BS1, a circuit element layer CEL, a light emitting element layer LEL, a first capping layer CPL1, a color conversion layer CCL, a second capping layer CPL2, a color filter layer CFL, and a second base substrate BS2.

In an embodiment, the display device 1000 may be a light emitting display device. For example, the display device 1000 may be a light-emitting diode (LED) display device, an organic electroluminescence display device, or a quantum dot (QD) light emitting display device. However, the present invention is not limited thereto.

In an embodiment, the first base substrate BS1 may be at least one of a polymer substrate, a silicon substrate, a plastic substrate, a glass substrate, a metal substrate, and a composite material substrate. The first base substrate BS1 may have a single-layer structure or a multi-layer structure. The first base substrate BS1 may have a multi-layer structure including a plurality of synthetic resin film layers. The synthetic resin film may include a polyimide-based resin, acrylic-based resin, vinyl-based resin, epoxy-based resin, urethane-based resin, cellulose-based resin, perylene-based resin, or the like, but materials of the synthetic resin film are not limited thereto.

In an embodiment, the circuit element layer CEL may be disposed on the first base substrate BS1. The circuit element layer CEL may include insulating layers, a plurality of conductive layers, and a semiconductor layer. The circuit element layer CEL may include a plurality of thin film transistors included in a plurality of pixels. The plurality of thin film transistors may drive light emitting diodes (LEDs) included in the pixels.

In an embodiment, the light emitting element layer LEL may be disposed on the circuit element layer CEL. The light emitting element layer LEL may include a pixel defining layer PDL, the light emitting diode LED, and an encapsulation layer TFE.

In an embodiment, the light emitting diode LED may include a first electrode EL1, a second electrode EL2 facing the first electrode EL1, and a light emitting layer OL disposed between the first electrode EL1 and the second electrode EL2. Although not shown, the light emitting diode LED may further include a hole transport region and an electron transport region.

In an embodiment, the light emitting diode LED may generate light by recombination of holes and electrons injected from each of the first and second electrodes EL1 and EL2 in the light emitting layer OL. Light generated by the light emitting layer OL may be a first light having a specific wavelength range. For example, the first light may be blue light. The light emitting element layer LEL may provide the first light generated by the light emitting layer OL onto the light emitting element layer LEL.

In an embodiment, the light emitting diode LED is not limited to an organic light emitting element, and may be a nano light emitting element or a quantum dot light emitting element. A light emitting source included in the light emitting layer OL may be a nanomaterial, a quantum dot, or a quantum rod, and the light emitting diode LED may provide light by the light emitting source included in the light emitting layer OL.

In an embodiment, the pixel defining layer PDL may be disposed on the circuit element layer CEL. The pixel defining layer PDL may define predetermined openings. Openings defined in the pixel definition layer PDL may correspond to the plurality of pixels PX1, PX2, PX3, and PX4 of the display device 1000.

In an embodiment, the pixel defining layer PDL may include an organic resin or an inorganic material. For example, the pixel defining layer PDL may include a polyacrylate-based resin or a polyimide-based resin, silicon nitride (SiNx), silicon oxide (SiOx), silicon nitride (SiOxNy), or the like.

In an embodiment, the encapsulation layer TFE may be disposed on the light emitting diode LED to seal the light emitting diode LED. The encapsulation layer TFE may protect the light emitting diode LED from moisture and/or oxygen, and may protect the light emitting diode LED from foreign substances.

Although the encapsulation layer TFE is shown as one layer in FIG. 11, in an embodiment, the encapsulation layer TFE may include at least one organic layer or an inorganic layer, or may include an organic layer and an inorganic layer. For example, the encapsulation layer TFE may have a structure in which an organic layer and an inorganic layer are alternately stacked, or an inorganic layer, an organic layer, and an inorganic layer may be sequentially stacked.

In an embodiment, the inorganic layer included in the encapsulation layer TFE may include, for example, a silicon nitride layer, a silicon oxynitride layer, a silicon oxide layer, a titanium oxide layer, an aluminum oxide layer, or the like. The organic layer included in the encapsulation layer TFE may include an acryl-based organic layer. However, the present invention is not limited thereto.

In an embodiment, the inkjet printing apparatus of the present invention may be used to form the light emitting diode LED. The inkjet printing apparatus of the present invention may form a light emitting pattern constituting a light emitting layer.

In an embodiment, the color conversion layer CCL may be disposed on the display device 1000. The color conversion layer CCL may include a plurality of color conversion patterns CCL1 and CCL2, a transmission layer TL, a light blocking layer BK, and a capping layer CPL.

In an embodiment, each of the plurality of color conversion patterns CCL1 and CCL2 may convert the first light provided by the light emitting diode LED into light having a different wavelength range. For example, each of the plurality of color conversion patterns CCL1 and CCL2 may include quantum dots, and the quantum dots may convert the first light into lights having different wavelength ranges.

In an embodiment, each of the plurality of color conversion patterns CCL1 and CCL2 may include a first color conversion pattern CCL1 and a second color conversion pattern CCL2. The first color conversion pattern CCL1 may convert the first light provided by the light emitting diode LED into a second light having a different wavelength range from the first light. The second color conversion pattern CCL2 may convert the first light into a third light having a different wavelength range from that of the first light and the second light. For example, the first light may be blue light. The first color conversion pattern CCL1 may convert the first light into red light, and the second color conversion pattern CCL2 may convert the first light into green light.

In an embodiment, the transmission layer TL may transmit the first light provided by the light emitting diode LED. For example, the transmission layer TL may transmit blue light. The transmission layer TL may include a transparent resin, and may further include a blue pigment, dye, or scattering material dispersed in the transparent resin.

In an embodiment, the first color conversion pattern CCL1 may overlap the first pixel PX1 of the display device 1000. The second color conversion pattern CCL2 may overlap the second pixel PX2 of the display device 1000. The transmission layer TL may overlap the third pixel PX3 of the display device 1000.

In an embodiment, the light blocking layer BK may distinguish a boundary between the plurality of color conversion patterns CCL1 and CCL2 and the transmission layer TL. The light blocking layer BK may overlap the pixel defining layer PDL in a plan view. The light blocking layer BK may prevent light leakage. For example, the light blocking layer BK may include an organic light blocking material, a black pigment, or a black dye.

In an embodiment, the inkjet printing apparatus may be used to form the color conversion layer CCL. The inkjet printing apparatus according to embodiments may form color conversion patterns constituting the color conversion layer CCL. The color conversion pattern may include the plurality of color conversion patterns CCL1 and CCL2 and the transmission layer TL. That is, the plurality of color conversion patterns CCL1 and CCL2 and the transmission layer TL may be formed through the inkjet printing apparatus according to embodiments.

In an embodiment, the first capping layer CPL1 may be disposed under the plurality of color conversion patterns CCL1 and CCL2, the transmission layer TL, and the light blocking layer BK to cover lower surfaces of the plurality of color conversion patterns CCL1 and CCL2, the transmission layer TL, and the light blocking layer BK. The first capping layer CPL1 may block the plurality of color conversion patterns CCL1 and CCL2 and the transmission layer TL from being exposed to moisture/oxygen.

In an embodiment, the second capping layer CPL2 may be disposed between the color filter layer CFL and the color conversion layer CCL. The second capping layer CPL2 may be a layer disposed on the color filters CF1, CF2, and CF3 to cover the color filters CF1, CF2, and CF3 after the color filters CF1, CF2, and CF3 are formed in a manufacturing process of the color filter layer CFL. The second capping layer CPL2 may protect the color filters CF1, CF2, and CF3.

In an embodiment, the color filter layer CFL and partition part PP may be disposed on the color conversion layer CCL. The partition part PP may define a plurality of openings OP corresponding to the pixels PX1, PX2, and PX3.

In an embodiment, the color filter layer CFL may include the first to third color filters CF1, CF2, and CF3, respectively. The first to third color filters CF1, CF2, and CF3, respectively, may be disposed in the plurality of openings OP. In a plan view, the first color filter CF1 may overlap the first color conversion pattern CCL1, the second color filter CF2 may overlap the second color conversion pattern CCL2, and the third color filter CF3 may overlap the transmission layer TL. The first color filter CF1 may transmit the second light passing through the first color conversion pattern CCL1 and absorb the first light and the third light. The second color filter CF2 may transmit the third light passing through the second color conversion pattern CCL2 and absorb the first light and the second light. The third color filter CF3 may transmit the first light and absorb the second light and the third light.

In an embodiment, each of the first to third color filters CF1, CF2, and CF3, respectively, may absorb light in a specific wavelength range among external light directed to the display device 1000. Accordingly, the color filter layer CFL may reduce reflectance of external light of the display device 1000.

In an embodiment, the inkjet printing apparatus may be used to form the color filter layer CFL. The inkjet printing apparatus according to embodiments may form color filters constituting the color filter layer CFL. The color filters may include the first to third color filters CF1, CF2, and CF3, respectively. That is, the first to third color filters CF1, CF2, and CF3, respectively, may be formed through the inkjet printing apparatus according to embodiments.

In an embodiment, the second base substrate BS2 may be disposed on the color filter layer CFL. The second base substrate BS2 may face the first base substrate BS1.

The invention should not be construed as being limited to the embodiments set forth herein. Rather, these embodiments are provided so that this disclosure will be thorough and complete and will fully convey the concept of the invention to those skilled in the art. While the invention has been particularly shown and described with reference to embodiments thereof, it will be understood by those of ordinary skill in the art that various changes in form and details may be made therein without departing from the spirit or scope of the invention as defined by the following claims. Moreover, the embodiments or parts of the embodiments may be combined in whole or in part without departing from the scope of the invention.

What is claimed is:

1. An inkjet printing apparatus comprising:
a head pack including a plurality of heads,
wherein each of the plurality of heads includes a plurality of nozzles, and
wherein each of the plurality of heads extends in a first direction and are disposed adjacent to each other in a second direction intersecting the first direction, and
wherein a volume of a droplet ejected from each of the plurality of nozzles is alternately set to a first volume which is larger than a reference volume and a second volume which is smaller than the reference volume for each of the plurality of heads disposed along the second direction,
wherein the reference volume is a volume at which the droplet is ejected most quickly when the droplet is ejected from each of the nozzles with respect to a type of the droplet and a type of the inkjet printing apparatus.

2. The inkjet printing apparatus of claim 1, wherein the plurality of nozzles do not overlap each other in the second direction.

3. The inkjet printing apparatus of claim 1, wherein an absolute value of an excess ratio of the first volume to the reference volume, and an absolute value of a deficiency ratio of the second volume to the reference volume are equal to each other.

4. The inkjet printing apparatus of claim 3, wherein the excess ratio of the first volume to the reference volume is about +1.5%, and the deficiency ratio of the second volume to the reference volume is about −1.5%.

5. The inkjet printing apparatus of claim 3, wherein each of an absolute value of the excess ratio of the first volume to the reference volume, and an absolute value of the ratio of the deficiency ratio of the second volume to the reference volume is about 50% of a volume resolution of the droplet ejected from each of the plurality of nozzles.

6. The inkjet printing apparatus of claim 5, wherein the volume resolution of the droplet ejected from each of the plurality of nozzles is about 3%.

7. The inkjet printing apparatus of claim 1, wherein the plurality of heads includes first to fifth heads sequentially aligned in the second direction.

8. The inkjet printing apparatus of claim 7, wherein heads that are disposed adjacent to each other in the second direction among the first to fifth heads each have a different volume of droplets.

9. The inkjet printing apparatus of claim 7, wherein each of the plurality of nozzles of the first head ejects a droplet having a first volume,
each of the plurality of nozzles of the second head ejects a droplet having a second volume,
each of the plurality of nozzles of the third head ejects a droplet having the first volume,
each of the plurality of nozzles of the fourth head ejects a droplet having the second volume, and
each of the plurality of nozzles of the fifth head ejects a droplet having the first volume.

10. The inkjet printing apparatus of claim 9, wherein the first volume of the droplet ejected from each of the nozzles of the first head is about +1.5% of the reference volume,
the second volume of the droplet ejected from each of the plurality of nozzles of the second head is about −1.5% of the reference volume, the first volume of the droplet ejected from each of the plurality of nozzles of the third head is about +1.5% of the reference volume, the second volume of the droplet ejected from each of the plurality of nozzles of the fourth head is about −1.5% of the reference volume, and the first volume of the droplet ejected from each of the plurality of nozzles of the fifth head is about +1.5% of the reference volume.

11. The inkjet printing apparatus of claim 1, wherein the volume of a droplet ejected from each of the plurality of nozzles is adjusted by adjusting a voltage for each of the plurality of heads.

12. The inkjet printing apparatus of claim 1, wherein the head pack moves in the second direction.

13. The inkjet printing apparatus of claim 1, wherein each of the plurality of heads includes nozzle columns including the plurality of nozzles overlapping each other in the first direction, and the volume of a droplet ejected by each of the plurality of nozzles is different for each of the plurality of nozzle columns.

14. A method of inkjet printing comprising:

ejecting a plurality of droplets having a first volume onto a substrate by moving a plurality of nozzles included in a first head and extending in a first direction in a second direction that intersects the first direction;

ejecting a plurality of droplets having a second volume different from the first volume onto the substrate by moving a plurality of nozzles included in a second head in the second direction, wherein the second head is disposed adjacent to the first head in the second direction; and ejecting a plurality of droplets having the first volume by moving a plurality of nozzles included in a third head in the second direction, wherein the third head is disposed adjacent to the second head in the second direction, wherein a reference volume is a volume at which the droplet is ejected most quickly when the droplet is ejected from each of the nozzles with respect to a type of the droplet and a type of the inkjet printing apparatus, and wherein the first volume is larger than the reference volume, and the second volume is smaller than the reference volume.

15. The method of inkjet printing of claim 14, wherein an absolute value of an excess ratio of the first volume to the reference volume and an absolute value of a deficiency ratio of the second volume to the reference volume are equal to each other.

16. The method of inkjet printing of claim 15, wherein the excess ratio of the first volume to the reference volume is about +1.5%, and the deficiency ratio of the second volume to the reference volume is about −1.5%.

17. The method of inkjet printing of claim 14, wherein the plurality of nozzles included in the first head, the plurality of nozzles included in the second head and the plurality of nozzles included in the third head do not overlap each other in the second direction.

18. The method of inkjet printing of claim 14, wherein a volume of a droplet ejected from the plurality of nozzles included in the first head is adjusted by adjusting a voltage for the first head, a volume of a droplet ejected from the plurality of nozzles included in the second head is adjusted by adjusting a voltage for the second head, and a volume of a droplet ejected from the plurality of nozzles included in the third head is adjusted by adjusting a voltage for the third head.

19. The method of inkjet printing of claim 14, wherein the first volume of the droplet ejected from each of the plurality of nozzles included in the first head is about +1.5% of the reference volume, the second volume of the droplet ejected from each of the plurality of nozzles included in the second head is about −1.5% of the reference volume, and the first volume of the droplet ejected from each of the plurality of nozzles included in the third head is about +1.5% of the reference volume.

* * * * *